Figure 1:
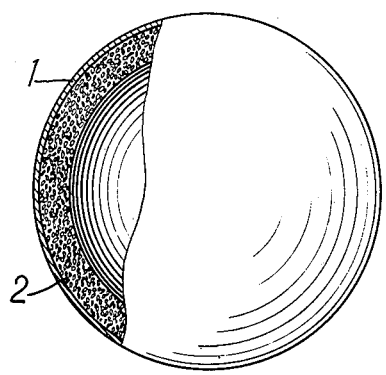

Jan. 14, 1958  C. C. NOGUÉ  2,819,753
METHOD OF MAKING AN INFLATED HOLLOW RUBBER ARTICLE
Filed June 18, 1956

INVENTOR.
CARLOS CAPELLA NOGUÉ

United States Patent Office 2,819,753
Patented Jan. 14, 1958

2,819,753

METHOD OF MAKING AN INFLATED HOLLOW RUBBER ARTICLE

Carlos Capella Nogué, Barcelona, Spain

Application June 18, 1956, Serial No. 591,842

2 Claims. (Cl. 154—16)

This invention relates to the manufacture of hollow rubber articles, and more particularly to methods for producing inflated hollow rubber articles which are capable of retaining their shapes although perforated or otherwise damaged.

This application is a continuation-in-part of my abandoned application, Serial No. 387,229, filed October 20, 1953.

It will be appreciated that hollow rubber articles, such as balls, dolls, water wings and so forth, are subject to the disadvantage that the thin walls thereof are readily damaged because of their low mechanical strength. Thus, these articles are easily perforated by sharp or pointed objects and rendered useless.

It is known that in order to avoid this disadvantage, rubber articles can be fabricated from cellular or sponge rubber. Sponge rubber articles are fully immune to perforation because they do not enclose large hollow spaces filled with air or some other gas under pressure.

However, sponge rubber articles, although satisfactory from the viewpoint of elasticity or resiliency, must as a practical matter be limited to small sizes because their weights increase in accordance with the cube of their diameters. Thus, in spite of their cellular construction, their weights can become excessive and uneconomical. Furthermore, this weight problem can limit the applications of this solution since, for example, water sport articles by their very nature are required to be of low weights.

Rubber articles manufactured in accordance with the present invention are characterized by the same low weight as are conventional hollow rubber articles and, furthermore, the cost of manufacture is approximately the same.

However, it is an object of this invention to provide improved light weight rubber articles which are practically immune to injury from mechanical perforation and like disturbances and which, accordingly, have a substantially longer life than has been previously achieved.

To achieve this objective the invention provides a method of manufacturing rubber articles whereby an article comprises two layers which are intimately connected to each other by vulcanization, the inner layer having a cellular structure and the outer layer a compact impervious structure. More particularly, the inner layer is constructed with sponge rubber whereas the outer layer is constructed of conventional homogeneous rubber. The individual cells of the spinge rubber are substantially isolated from one another and are separated by thin walls enclosing a gas within their confines.

The invention contemplates that the inner sponge rubber layer can be substantially thicker than the outer nonporous layer. For example, the inner layer may be from five to twenty times as thick. Advantageously, any articles made in accordance with the invention are practically immune to puncture because the hole is immediately sealed by the walls of the perforated cells due to pressure differential.

Now, it is known, to some extent, that a hollow rubber article can be fabricated from different layers of rubber. However, it is an object of the invention to provide an improved method of manufacturing such hollow rubber articles economically and conveniently while fully realizing the desired final shape of such articles.

To achieve this objective, the invention provides an improved method of manufacturing rubber articles by employing a variety of fabricating agents the purpose of which is to readily effect the production of rubber articles in a positive and accurate manner.

Other objects of the invention as well as advantages thereof will be pointed out in the following description and illustrated in the accompanying drawing which discloses by way of example the principle of the invention and the best mode which has been contemplated of applying that principle.

Figure 2:
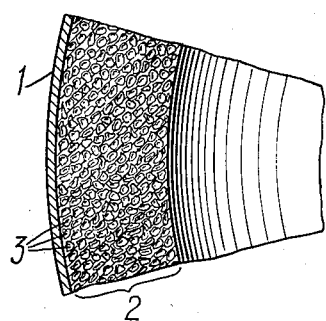
Figure 3:
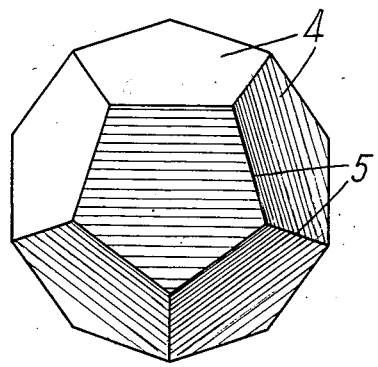
Figure 4:
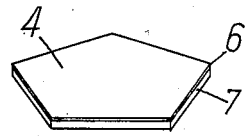
Figure 5:
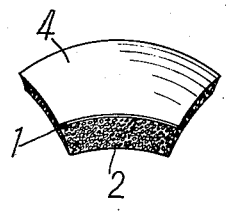

Reference will next be made to the accompanying drawing forming a part of this disclosure in which:

Figure 1 is an elevational view of a vulcanized rubber ball, having a portion thereof broken away and illustrating the wall structure as obtained in accordance with the invention, Figure 2 is an enlarged sectional view of a portion of the ball shown in Figure 1, Figure 3 is a view of an assembled raw body in the shape of a dodecahedron that permits the obtaining of the ball of Figure 1, Figure 4 is a perspective view of one of the pentagonal sections of Figure 3, Figure 5 is a perspective view of the same section of Figure 4 illustrating its ultimate shape provided during the vulcanization of the rubber ball.

Generally the method of the invention is applicable to the production of various hollow rubber articles such as have been previously noted. However, the invention will be described with reference to the production of a hollow ball to which inures the various benefits of the invention.

The invention includes the fabrication of a ball by forming a plurality of sections, each section being constituted by two layers with one layer being an unvulcanized rubber mix containing a foaming agent and the other layer being of unporous unvulcanized rubber. The several sections are assembled together with the foaming agent layer innermost and joined along all but one of their edges to form a hollow article. The edges are seamed together in entirely conventional manner for, since the pieces are in unvulcanized condition, the application of pressure such as by a hammer and anvil causes the pieces to stick together in abutting relationship. An expanding agent adapted to respond to the vulcanizing heat is introduced between the open adjoining edges into the cavity within the article formed by the assembled blank sections and the open adjoining edges are then also seamed. The hollow article so obtained is inflated with compressed air or some other gas under pressure, by means of an injection needle, approximately to its desired shape and size and it is then placed in a mold having the desired final contour of the article. The mold is heated in order to vulcanize the rubber layers and to activate the foaming and the expanding agents, whereby the foaming agent causes the formation of gas-tight cells throughout the inner layer and the expanding agent urges the rubber layers outwardly against the contour of the mold in a manner so as to assist whatever other pressure is provided within the ball. It has been found that the use of the expanding agent which will hereinafter be referred to in greater detail provides the most successful results with respect to the method of the invention.

In Figures 1 and 2 it will be noted that the vulcanized rubber ball comprises a hollow spherical body, the wall of which includes two intimately connected layers, the outer layer of which is a relatively thin layer 1 of compact non-porous rubber, whereas the inner layer 2 is of cellular structure. The various cells or pores 3 of this inner layer 2 are substantially without communication with each other in that they are separated by thin partitions enclosing a gas.

Referring next to Figures 3 and 4, it is seen that the raw rubber body is essentially constituted by a plurality of segments or sections 4 which are set together in the nature of a jigsaw puzzle so as to constitute a solid continuous wall. The sections 4 abut along the lines 5 and each of the sections 4 include the layers 6 and 7 corresponding to the layers 1 and 2 of the vulcanized ball as noted above.

The invention contemplates that the section 4 can be originally provided before assembly as flat or planar elements, the ultimate shape therefor being provided during some subsequent step of the method. In Figure 4, it will be noted that the segment 4 is provided with a pentagonal cross-section which will permit it to be properly fitted with identical sections to form a dodecahedron as illustrated in Figure 3.

The manufacture of hollow rubber articles, in accordance with the invention, is initiated by the manual or mechanical preparation of the sections 4 which are vulcanizable rubber blanks. These sections are assembled together as illustrated in Figure 3 and before seaming the last pair of adjoining edges 5, an expanding agent which responds to the heat of vulcanization is introduced into the cavity within the article formed. The completed raw body is then inflated by means of an injection needle with compressed air or some other gas under pressure until the raw body approximates the final desired shape and size. Finally, the inflated raw body is vulcanized in a mold. During this process, the expanding agent produces additional gases to urge the raw body against the mold so that the final shape of the product is closely controlled.

The inner layer 7 of the hollow body has distributed thereon a foaming agent which is likewise activated by the vulcanization process. Accordingly, as the ball is vulcanized into its final condition, the inner layer 7 becomes the sponge rubber layer 2 adapted to perform the functions heretofore noted, as illustrated in Figures 1, 2 and 5.

It has been observed that the size of the cells 3 is controllable by proportioning the foaming agent with respect to the expanding agent. For example, a large quantity of the expanding agent when used with a small quantity of foaming agent produces small pores 3. When a large quantity of foaming agent is used in combination with a small quantity of the expanding agent, larger pores 3 are produced. It is therefore possible to control the size of the pores of the inner layer 2 and therefore the thickness of this layer by proportioning the foaming and expanding agents.

The foaming agent which produces the cellular structure can be selected from one of the conventional agents used in the manufacture of rubber sponges, such as, for example, diazo-amino-benzol which develops nitrogen upon being heated. The expanding agent may be selected from one of the various substances used in the manufacture of rubber articles, such as, for example, sodium nitrite with ammonium chloride, or ammonium carbonate or the like.

It will be appreciated that the method of the invention is applicable to devices other than simple hollow rubber balls. For example, in accordance with the method of the invention, it is possible to produce a hollow rubber doll. In this event the shapes of the sections 4 will differ in accordance with the sections of the finished product of which the blanks will ultimately form a part.

All such hollow articles are manufactured as indicated above in that the blanks 4 are assembled and joined so as to provide a raw body in a shape which complies approximately to that of the inside of the mold. Before seaming the last pair of adjacent edges 5, the expanding agent is introduced into the cavity within the article formed and thereafter the completed raw body is inflated with compressed air or some other gas under pressure. The foaming agent having been previously applied and being responsive to heat of vulcanization is automatically activated during the subsequent vulcanizing step. The hollow rubber article which is at least in part forced against the inner face of the mold is assisted in this function by the expanding agent which also has the effect of forcing the raw body against the inner contour of the mold and which is likewise activated upon the execution of the vulcanizing step.

The subsequent vulcanization of the raw body results in a finished product to which inures the various benefits which have been noted.

In summary, it is to be understood that the shapes and sizes, as well as the number of the sections which are employed in the manufacture of the desired article, are selected in accordance with the desired ultimate configuration thereof, and that a simple method for determining the shapes of these segments other than by the appropriate theoretical design, would be constituted by making a model of the finished product and simply cutting the model into mating sections which can be assembled like a jigsaw puzzle to form the article in its entirety. Although in the event of hollow rubber balls the use of segments of pentagonal cross-section as illustrated in Figures 3 and 4 is especially advantageous, the number of segments and the particular outline configuration thereof are not to be understood as being limitative of this invention.

There are now but obvious to those skilled in the art many modifications and variations utilizing the principle set forth and realizing many or all of the objectives and advantages of the method described but which do not depart essentially from the spirit of the invention.

What is claimed is:

1. The method of manufacturing a hollow rubber article which comprises the steps of preparing blank wall sections, each consisting of two superposed layers of vulcanizable rubber sheet, one layer being the inner layer of the article being provided with a foaming agent adapted to be activated by vulcanizing and uniformly distributed therein; assembling together the blank wall sections substantially to the shape of the hollow article and seaming all but one of the adjoining edges of the sections; introducing an expanding agent between the open adjoining edges into the cavity within the article formed by the assembled blank sections; seaming the open adjoining edges; inflating the hollow article substantially to its desired shape and size; and vulcanizing the inflated article within a mold having the desired final contour of the article so that said layers are vulcanized together while said expanding agent holds the article against the mold surface, and said foaming agent causes the formation within said inner layer of a multiplicity of cells separated from each other and each enclosing a gaseous medium.

2. The method of manufacturing a hollow rubber article which comprises the steps of preparing blank wall sections, each consisting of two superposed layers of vulcanizable rubber sheet, one layer being the inner layer of the article and being provided with a foaming agent adapted to be activated by vulcanizing and uniformly distributed therein; assembling together the blank wall sections substantially to the shape of the hollow article and seaming the adjoining edges of the sections so that no more than one pair of adjoining edges is left open; introducing an expanding agent into the cavity within the article formed by the assembled blank sections, inflating the hollow article substantially to its desired shape and size and permanently sealing the expanding agent in the cavity; and vulcanizing the inflated article within a mold having the desired final contour of the article so that said layers are vulcanized together while said expanding agent holds the article against the mold surface, and so that said foaming agent causes the formation within said inner layer of a multiplicity of cells separated from each other and each enclosing a gaseous medium.

References Cited in the file of this patent

UNITED STATES PATENTS

| | | |
|---|---|---|
| 1,402,682 | Takashima | Jan. 3, 1922 |
| 1,409,059 | Miller | Mar. 7, 1922 |
| 2,394,122 | Urmston | Feb. 5, 1946 |
| 2,463,289 | Leguillon | Mar. 1, 1949 |
| 2,483,234 | Roberts | Sept. 27, 1949 |
| 2,658,876 | Reynolds | Nov. 10, 1953 |